US012405416B2

(12) United States Patent
Lai et al.

(10) Patent No.: US 12,405,416 B2
(45) Date of Patent: Sep. 2, 2025

(54) ELECTRONIC DEVICE

(71) Applicant: InnoLux Corporation, Miao-Li County (TW)

(72) Inventors: Yi-Cheng Lai, Miao-Li County (TW); Chih-Hung Liu, Miao-Li County (TW); Chih-Hung Hsu, Miao-Li County (TW); I-Han Liu, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 18/745,565

(22) Filed: Jun. 17, 2024

(65) Prior Publication Data
US 2025/0028110 A1 Jan. 23, 2025

Related U.S. Application Data

(60) Provisional application No. 63/527,164, filed on Jul. 17, 2023.

(30) Foreign Application Priority Data

Mar. 20, 2024  (CN) .......................... 202410319770.6

(51) Int. Cl.
F21V 8/00 (2006.01)

(52) U.S. Cl.
CPC ......... *G02B 6/0088* (2013.01); *G02B 6/0038* (2013.01); *G02B 6/0055* (2013.01); *G02B 6/0073* (2013.01)

(58) Field of Classification Search
CPC .. G02B 6/0088; G02B 6/0038; G02B 6/0055; G02B 6/0073; G02F 1/133605; G02F 1/133608
See application file for complete search history.

(56) References Cited

U.S. PATENT DOCUMENTS 6,835,961 B2 * 12/2004 Fukayama ............ G06F 1/1616
349/59
7,490,963 B2  2/2009 Fang et al.
(Continued)

FOREIGN PATENT DOCUMENTS

CN  111273473 A  6/2020
EP    2157474 A  2/2010

*Primary Examiner* — Tsion Tumebo
(74) *Attorney, Agent, or Firm* — MUNCY, GEISSLER, OLDS & LOWE, P.C.

(57) ABSTRACT

An electronic device is provided. The electronic device includes a substrate, a first optical film and a second optical film. The first optical film is disposed on the substrate, and the first optical film includes an engaging portion. The second optical film is disposed on the substrate and having an upper surface and a lower surface opposite to each other, and the second optical film is in mutual interference with the engaging portion of the first optical film. The engaging portion includes a first portion, a second portion and an engaging structure, and the first portion and second portion are disposed on opposite sides of the engaging structure, and one of the first portion and the second portion is disposed on the upper surface of the second optical film and the other one is disposed below the lower surface of the second optical film.

20 Claims, 4 Drawing Sheets

(56) References Cited

U.S. PATENT DOCUMENTS

| | | | | |
|---|---|---|---|---|
| 7,578,609 | B2* | 8/2009 | Chang | G02F 1/133608 |
| | | | | 362/633 |
| 7,744,234 | B2* | 6/2010 | Jeong | G02F 1/133608 |
| | | | | 362/97.4 |
| 8,430,519 | B2* | 4/2013 | Takata | G02F 1/133606 |
| | | | | 362/97.3 |
| 10,466,535 | B2* | 11/2019 | Lee | G02F 1/133608 |
| 11,131,881 | B1* | 9/2021 | Tseng | G02B 6/0088 |
| 2003/0016313 | A1* | 1/2003 | Jeong | G02F 1/133308 |
| | | | | 349/58 |
| 2007/0230206 | A1* | 10/2007 | Hsiao | G02F 1/133605 |
| | | | | 362/560 |
| 2008/0170416 | A1* | 7/2008 | Yuan | G02F 1/133608 |
| | | | | 445/24 |
| 2009/0262554 | A1* | 10/2009 | Lee | G02F 1/133308 |
| | | | | 362/633 |
| 2016/0097892 | A1* | 4/2016 | Jeon | G02B 6/0068 |
| | | | | 362/606 |
| 2016/0161085 | A1* | 6/2016 | Kwon | G02F 1/133305 |
| | | | | 362/97.1 |

* cited by examiner

ELECTRONIC DEVICE

CROSS-REFERENCE TO RELATED APPLICATIONS

This application claims the benefit of filing date of U.S. Provisional Application Ser. No. 63/527,164 filed Jul. 17, 2023 under 35 USC § 119 (e)(1), and also claims the benefit of the Chinese Patent Application Serial Number 202410319770.6, filed on Mar. 20, 2024, the subject matter of which is incorporated herein by reference.

BACKGROUND

Field of the Disclosure

The present disclosure relates to an electronic device and, more particularly, to an electronic device with a light emitting function.

Description of Related Art

Electronic devices, such as direct backlight modules or display devices, are usually provided with multiple optical films. If the multiple optical films disposed at the edge of the electronic device are offset or rotated during assembly, it may cause the bottom plate of the electronic device to be exposed in the gap between the optical films, resulting in affecting the overall optical quality of the backlight module or display device. Therefore, the optical films must be limited in positions. The current position limiting method of optical films is to bond the optical films through manual vision. However, this method is likely to cause errors; for example, the results of execution by different personnel are inconsistent.

Therefore, there is a need to provide an improved electronic device so as to alleviate and/or obviate the above problems.

SUMMARY

The preset disclosure provides an electronic device, which includes: a substrate; a first optical film disposed on the substrate, wherein the first optical film includes an engaging portion; and a second optical film disposed on the substrate and provided with an upper surface and a lower surface opposite to each other, wherein the second optical film is in mutual interference with the engaging portion of the first optical film, wherein the engaging portion includes a first portion, a second portion and an engaging structure, the first portion and the second portion are disposed on opposite sides of the engaging structure, one of the first portion and the second portion is disposed above the upper surface of the second optical film, and the other one is disposed below the lower surface of the second optical film.

Other novel features of the disclosure will become more apparent from the following detailed description when taken in conjunction with the accompanying drawings.

DETAILED DESCRIPTION OF EMBODIMENT

Figure 1A:
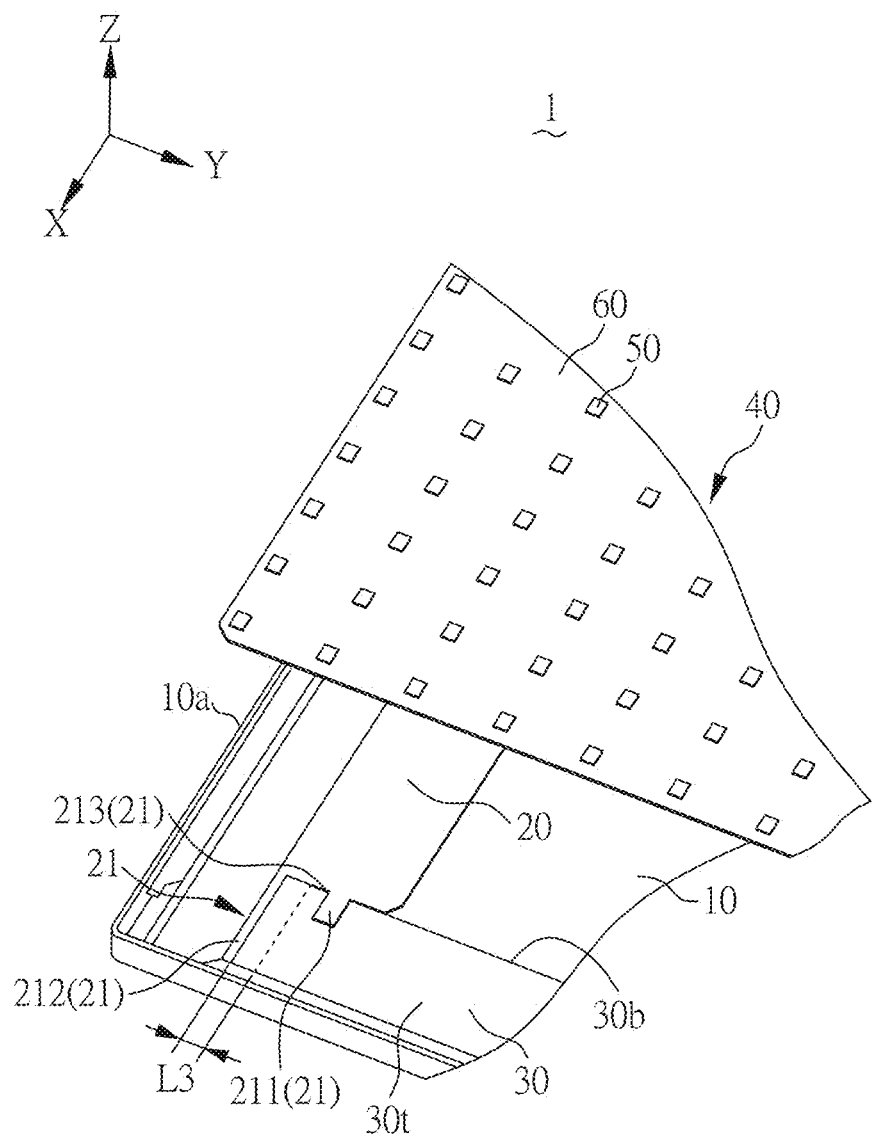
FIG. 1A is an exploded schematic diagram of an electronic device according to an embodiment of the present disclosure.

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "comprising", "containing" and "having" are open-ended words, and should be interpreted as meaning "including but not limited to".

The terms, such as "about", "substantially", or "approximately", are generally interpreted as within 10% of a given value or range, or as within 5%, 3%, 2%, 1%, or 0.5% of a given value or range.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

In the present disclosure, the term "a given range is from a first value to a second value" or "a given range is within a range from the first value to the second value" means that the given range includes the first value, the second value and other values between the first value and the second value.

It should be understood that, according to the embodiments of the present disclosure, an optical microscope (OM), a scanning electron microscope (SEM), a film thickness profiler (α-step), an ellipse thickness gauge or other suitable measurement means may be used to measure the depth, thickness, width or height of each component, or the spacing or distance between components. According to some embodiments, a scanning electron microscope may be used to obtain a cross-sectional structural image including the components to be measured, and measure the depth, thickness, width or height of each component, or the spacing or distance between components.

In addition, the electronic device disclosed in the present disclosure may be an automotive device, a sensing device, a display device, a backlight device, an antenna device, a tiled device, a touch display, a curved display or a free shape display, but not limited thereto. The electronic device may include, for example, liquid crystal, light emitting diode, fluorescence, phosphor, other suitable display media, or a combination of the above, but it is not limited thereto. The display device may be a non-self-luminous display device or a self-luminous display device. The antenna device may be a liquid crystal type antenna device or a non-liquid crystal type antenna device. The sensing device may be a sensing device that senses capacitance, light, heat energy or ultrasonic waves, but not limited thereto. The tiled device may be, for example, a display tiled device or an antenna tiled device, but not limited thereto. It should be noted that the electronic device may be any combination of the above, but not limited thereto. In addition, the electronic device may be a bendable or flexible electronic device. It should be noted that the electronic device may be any combination of the above, but not limited thereto. In addition, the shape of the electronic device may be a rectangular shape, a circular shape, a polygonal shape, a shape with curved edges, or other suitable shapes. The electronic device may have peripheral systems such as a driving system, a control system, a light source system, a shelf system, etc. to support the display device, antenna device or tiled device. In addition, the electronic device may include an electronic unit, and the electronic unit may include passive components and active components, such as capacitors, resistors, inductors, electrodes, liquid crystal cells, variable capacitors, filters, light emitting units, diodes, transistors, sensors, micro-electro-mechanical systems (MEMS) components, liquid crystal chips, controllers, etc., but not limited thereto. The diode may be a light emitting diode or a photodiode. The light emitting diode may be, for example, an organic light emitting diode (OLED), a sub-millimeter light emitting diodes (mini LED), a micro light emitting diode (micro LED), and a quantum dot light emitting diode (quantum dot LED), fluorescence, phosphor or other suitable materials, or a combination of the above, but not limited thereto. The sensor may be, for example, a capacitive sensor, an optical sensor, an electromagnetic sensor, a fingerprint sensor (FPS), a touch sensor, an antenna, a pen sensor, etc., but not limited thereto. The controller may be, for example, a timing controller, but not limited thereto. In the following, a display device will be used as an electronic device to illustrate the content of the present disclosure, but the present disclosure is not limited thereto.

It is noted that the following are exemplary embodiments of the present disclosure, but the present disclosure is not limited thereto, while a feature of some embodiments can be applied to other embodiments through suitable modification, substitution, combination, or separation. In addition, the present disclosure can be combined with other known structures to form further embodiments.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way. Unless there is a special definition in the embodiment of the present disclosure.

In addition, the term "adjacent" or "neighboring" in the specification and claims is used to describe mutual proximity, and does not necessarily mean mutual contact.

In addition, the descriptions such as "when" or "during" in the present disclosure represent aspects such as "now, before or after", and are not limited to situations that occur at the same time, which is described first here. In the present disclosure, similar descriptions such as "arranged on" refer to the corresponding positional relationship between the two components, and do not limit whether there is contact between the two components, unless otherwise specified, which is described here first. Furthermore, when the present disclosure discloses multiple functions, if the word "or" is used between the functions, it means that the functions may exist independently, but it does not exclude that multiple functions may exist simultaneously.

Figure 1B:
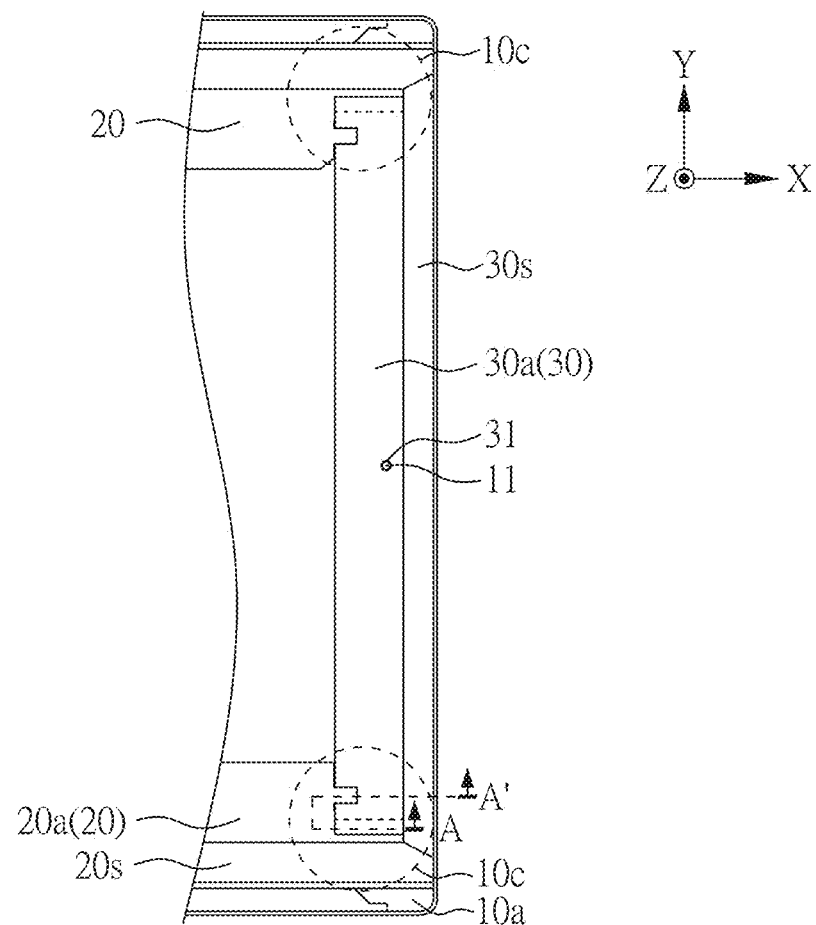
FIG. 1B is a detailed structural diagram of an edge portion of an electronic device according to an embodiment of the present disclosure.
Figure 1C:
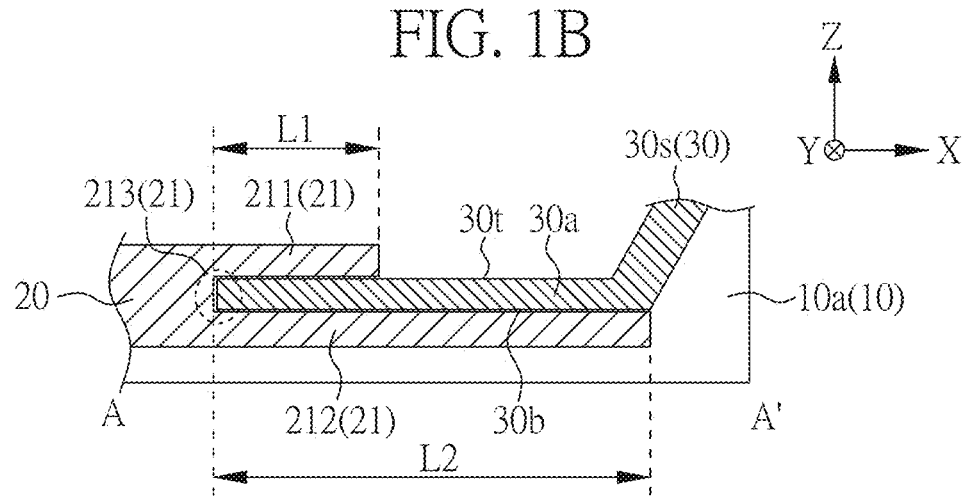
FIG. 1C is a cross-sectional view of the electronic device taken along line A-A' in FIG. 1B.
Figure 2:
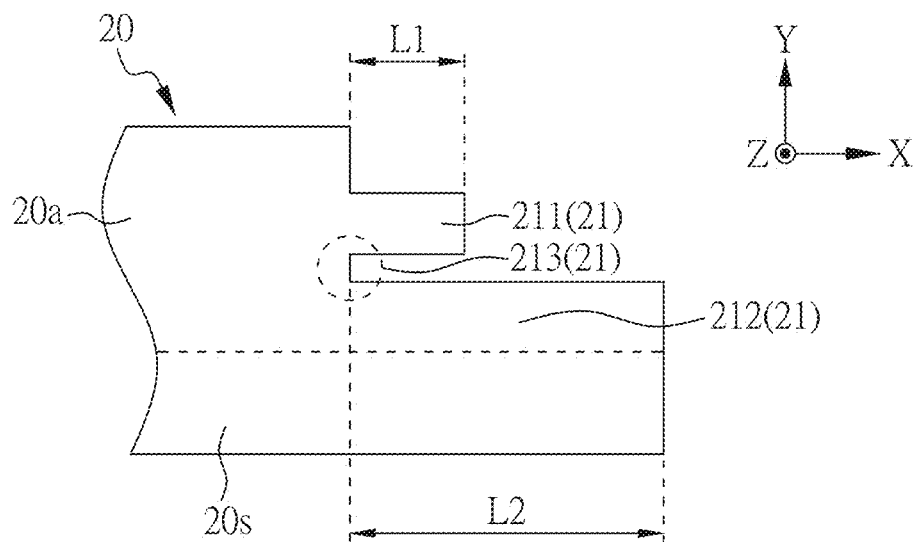
FIG. 2 is a schematic diagram of the engaging portion of the first optical film according to an embodiment of the present disclosure.

Please refer to FIG. 1A to FIG. 2, in which FIG. 1A is an exploded schematic diagram of part of the electronic device 1 according to an embodiment of the present disclosure, FIG. 1B is a detailed structural diagram of an edge portion of the electronic device 1 according to an embodiment of the present disclosure, FIG. 1C is a cross-sectional view of the electronic device taken along line A-A' in FIG. 1B, and FIG. 2 is a schematic diagram of the engaging portion 21 of the first optical film 20 according to an embodiment of the present disclosure.

As shown in FIG. 1A, the electronic device 1 may include a substrate 10, a first optical film 20 and a second optical film 30. In one embodiment, the electronic device 1 may further include a second substrate 40. In one embodiment, the electronic device 1 may further include a plurality of electronic units 50 and may be arranged in a matrix, but it is not limited thereto. The first optical film 20 is disposed on the substrate 10, and the first optical film 20 includes an engaging portion 21. The second optical film 30 is disposed on the substrate 10, and is in mutual interference with the engaging portion 21 of the first optical film 20. The term "mutual interference" here may be, for example, "structural interference", where structural interference may refer to, for example, that there is contact between the two and that one of the two abuts against at least a portion of the structure of the other one, thereby achieving the effects of engagement and/or limiting, but it is not limited thereto.

In addition, in one embodiment, in the top view direction of the electronic device 1 (that is, the third direction Z), the second substrate 40 may be disposed on the substrate 10 and partially overlap with the substrate 10; for example, it is closely attached to the substrate, or there may be spacers (not shown) disposed between the second substrate 40 and the substrate 10, but it is not limited thereto. In one embodiment, the first optical film 20 and the second optical film 30 may be located between the substrate 10 and the second substrate 40. The second substrate 40 at least partially overlaps with the first optical film 20 or the second optical film 30 in the third direction Z, or may not overlap therewith. In addition, the electronic unit 50 may be disposed on the second substrate 40, so the first optical film 20 and the second optical film 30 may be regarded as being located between the substrate 10 and the electronic unit 50. In addition, in one embodiment, the electronic device 1 may include a third optical film 60 disposed on the second substrate 40. The third optical film 60 may be provided with a plurality of openings, and each opening may correspond to the position of each electronic unit 50 on the second substrate 40, so that the electronic unit 50 may be exposed by the opening.

Please refer to FIG. 2 at the same time. Furthermore, the engaging portion 21 includes a first portion 211, a second portion 212 and an engaging structure 213. The first portion 211 and the second portion 212 are disposed on opposite sides of the engaging structure 213, for example, disposed on two sides of the engaging structure 213 along the first direction Y. In one embodiment, the first portion 211 and the second portion 212 may be separated along the first direction Y; that is, there is a gap between the first portion 211 and the second portion 212 in the first direction Y, so that the gap may form the engaging structure 213, and the length of the gap along the first direction Y may be greater than or equal to 0, but it is not limited thereto. The first portion 211 and the second portion 212 may be connected to a main body portion 20a of the first optical film 20. In addition, when the first optical film 20 and the second optical film 30 are engaged and thus interfere with each other, one of the first portion 211 and the second portion 212 may be located above the upper surface 30t of the second optical film 30, and the other one may be located below the lower surface 30b. For example, the first portion 211 is adjacent to the upper surface 30t of the second optical film 30 and is located above the upper surface 30t, and the second portion 212 is adjacent to the lower surface 30b of the second optical film 30 and is located below the lower surface 30b. In another embodiment, the first portion 211 may be located below the lower surface 30b of the second optical film 30, and the second portion 212 may be located above the upper surface 30t. In addition, in one embodiment, the second portion 212 is closer to the edge portion 10a of the substrate 10 than the first portion 211, while it is not limited thereto. In addition, in one embodiment, the engaging structure 213 may be, for example, a groove (that is, the gap is greater than 0) or a slit (that is, the gap is equal to 0; in other words, when the first portion 211 and the second portion 212 are located on the same plane, at least part of the first portion 211 may be in contact with the second portion 212), while it is not limited thereto.

Please refer to FIG. 1A and FIG. 2 again. In one embodiment, the second portion 212 and the second optical film 30 have an overlap length L3 along the first direction Y. In one embodiment, the overlap length L3 may be between 5 millimeters and 15 millimeters (5 mm≤L3≤15 mm). In one embodiment, the overlap length L3 may be between 7.5 millimeters and 12 millimeters (7.5 mm≤L3≤12 mm). It is noted that the above values are for illustrative purpose only.

In one embodiment, the electronic device 1 may be, for example, a backlight module, but it is not limited thereto. In one embodiment, the electronic device 1 may be, for example, a direct backlight module, but it is not limited thereto. In one embodiment, the electronic device 1 may be, for example, a sub-millimeter light emitting diode (MINI LED) backlight module, but it is not limited thereto. In one embodiment, the substrate 10 may be, for example, a backplane of the electronic device 1, but it is not limited thereto. In one embodiment, the first optical film 20, the second optical film 30 or the third optical film 60 may be, for example, a reflective film, but may also be a suitable type of optical film, such as an optical filter, a light enhancing mode, a light guide film, etc., while it is not limited thereto. In addition, in one embodiment, the electronic unit 50 may be, for example, a light emitting unit, such as but not limited to a light emitting diode. In this case, the second substrate 40 may be a backlight plate, and the electronic device 1 may further include a display panel (not shown), and the second substrate 40 may be disposed between the substrate 10 and the display panel, so that the first optical film 20 and the second optical film 30 may be disposed between the substrate 10 and the plurality of electronic units 50.

Next, the arrangement of the substrate 10, the first optical film 20 and the second optical film 30 will be described with reference to FIG. 1B, wherein the electronic device 1 shown in FIG. 1B is in a state in which the second substrate 40 has been removed.

As shown in FIG. 1B, the first optical film 20 and the second optical film 30 may each be disposed adjacent to an edge of the electronic device 1. The engaging portion 21 of the first optical film 20 may be adjacent to or disposed at a corner 10c of the substrate 10. The first optical film 20 and the second optical film 30 each may, for example, have a strip structure, wherein a main body portion 30a of the second optical film 30 may, for example, extend in the first direction Y, and a main body portion 20a of the first optical film 20 may, for example, extend in the second direction X, where the first direction Y and the second direction X are substantially perpendicular. The engaging portion 21 may be adjacent to an end portion of the main body portion 20a of the first optical film 20. In addition, the first optical film 20 and the second optical film 30 may respectively have a side wall portion 20s and a side wall portion 30s extending from the main body portion 20a and the main body portion 30a along the third direction Z (or extending in a direction slightly offset from the third direction Z, such as 60 degrees offset from the third direction Z, but not limited thereto), wherein the third direction Z is substantially perpendicular to the first direction Y and the second direction X, respectively. The side wall portion 20s of the first optical film 20 and the side wall portion 30s of the second optical film 30 may be used to abut the edge portion 10a of the substrate 10. Please refer to FIG. 2 as well. The side wall portion 20s of the first optical film 20 may be connected to the main body portion 20a and the second portion 212 of the first optical film 20, but it is not limited thereto.

In addition, the substrate 10 may be provided with a bump 11 extending along the third direction Z, and the main body portion 30a of the second optical film 30 may be provided with an opening 31. The size of the opening 31 may be equal to or slightly larger than the size of the bump 11 ("slightly larger" here means that the size of the opening 31 must allow the bump 11 to penetrate the opening 31, and the inner wall of the opening 31 must be at least partially in contact with the bump 11 so that the bump 11 may not easily fall off from the opening 31), and the position of the opening 31 may correspond to the position of the bump 11, so that the bump 11 may penetrate the opening 31. Through the design of the bump 11 and the opening 31, the second optical film 30 may be positioned on the substrate 20. In one embodiment, the substrate 10 may have another bump (not shown), and the main body portion 20a of the first optical film 20 may also have an opening (not shown) similar to the opening 31, so that the first optical film 20 may be positioned on the substrate 10 through its own opening and the other bump. In addition, in another embodiment, the edge of the substrate 10 may have a plurality of bumps (not shown), and the first optical film 20 and/or the second optical film 30 may also have a plurality of openings (not shown) corresponding to the bumps. In other words, the number of bumps and openings may be one or more, and is not particularly limited in the present disclosure.

Next, the details of the mutual interference between the engaging portion 21 of the first optical film 20 and the second optical film 30 will be described with reference to FIG. 1C, and please also refer to FIG. 1A and FIG. 1B at the same time.

As shown in FIG. 1C, when viewed from the cross-sectional direction, the engaging structure 213 is disposed between the first portion 211 and the second portion 212, and at least part of the main body portion 30a of the second optical film 30 may be inserted into the engaging structure 213 and sandwiched between the first portion 211 and the second portion 212. As shown in FIG. 1A and FIG. 1B, part of the surface 30t of the second optical film 30 is in contact with the first portion 211, and part 30b of the other surface of the second optical film 30 is in contact with the second portion 212. Therefore, it can be seen that, in one embodiment, the first portion 211 and the second portion 212 are separated and arranged in the first direction Y, and the engagement direction of the first portion 211 or the second portion 212 and the second optical film 30 (that is, the normal direction of the contact surface between the first portion 211 or the second portion 212 and the second optical film 30) may be perpendicular to the first direction Y. For example, the engagement direction may be parallel to the third direction Z, while it is not limited thereto. As a result, the first optical film 20 and the second optical film 30 may be engaged with each other so as to interfere with each other.

In one embodiment, the first portion 211 has a first maximum length L1 in the second direction X, and the second portion 212 has a second maximum length L2 in the second direction X, wherein the first maximum length L1 and the second maximum length L2 may be measured starting from the engaging structure 213 (that is, starting from the intersection of the engaging structure 213 and the main body 20a) and along the second direction X, wherein the first maximum length L1 is not equal to the second maximum length L2. In one embodiment, the first maximum length L1 may be smaller than the second maximum length L2, but it is not limited thereto.

Accordingly, the first optical film 20 and the second optical film 30 may interfere with each other for being fixed, thereby reducing the shift and/or rotation of the first optical film 20 or the second optical film 30 relative to the substrate 10, so as to reduce the chance of the substrate 10 being exposed. Therefore, the optical quality of the electronic device 1 of the present disclosure can be improved.

Figure 3A:
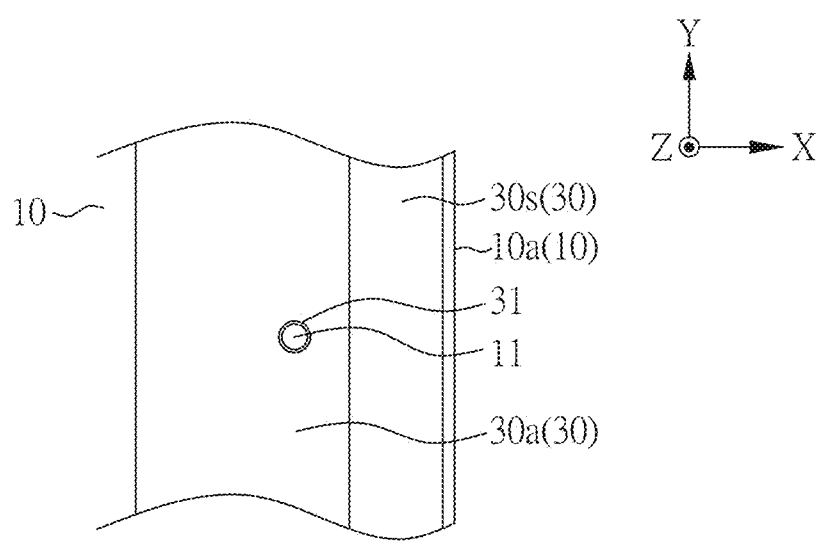
FIG. 3A is a schematic diagram of bump and opening according to an embodiment of the present disclosure.
Figure 3B:
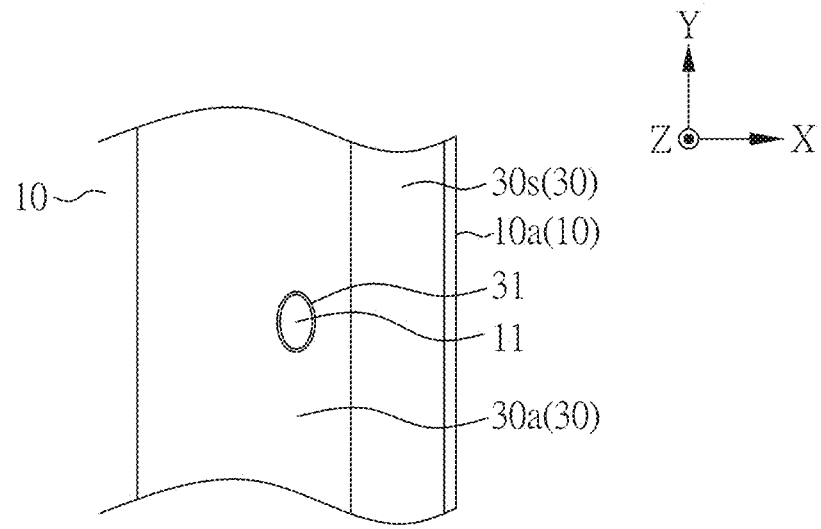
FIG. 3B is a schematic diagram of bump and opening according to an embodiment of the present disclosure.
Figure 3C:
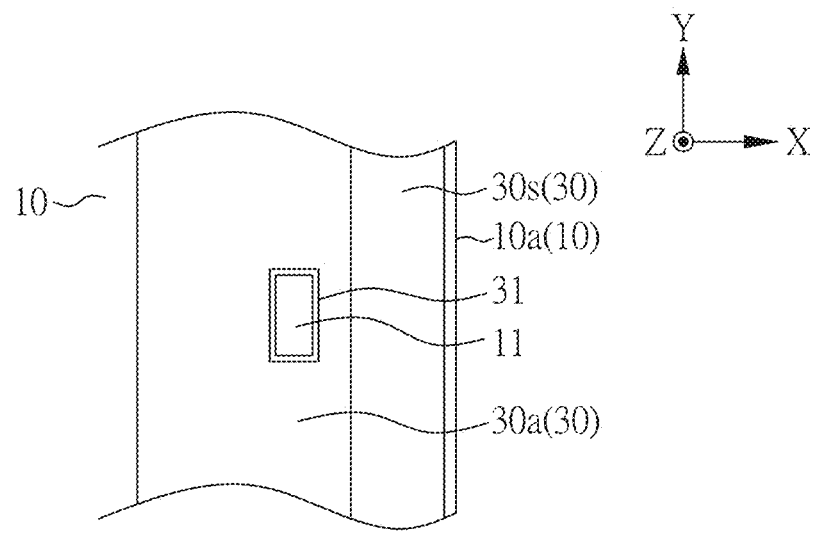
FIG. 3C is a schematic diagram of bump and opening according to an embodiment of the present disclosure.

The bump 11 of the substrate 10 and the opening 31 of the second optical film 30 of the present disclosure may also have different implementation aspects. FIG. 3A to FIG. 3C are schematic diagrams illustrating the bump 11 and the opening 31 in different embodiments of the present disclosure, and please refer to FIG. 1A to FIG. 2 at the same time.

In the embodiment of FIG. 3A, the bump 11 is, for example, a circular bump, and the opening 31 may be a circular opening with a size equal to or slightly larger than that of the bump 11.

In the embodiment of FIG. 3B, the bump 11 is, for example, an elliptical bump, and the opening 31 may be an elliptical opening with a size equal to or slightly larger than that of the bump 11. Through the design of the elliptical bump and the elliptical opening, the chance of the second optical film 30 being rotated relative to the substrate 10 may be reduced, while it is not limited thereto.

In the embodiment of FIG. 3C, the bump 11 is, for example, a rectangular bump, and the opening 31 may be a rectangular opening with a size equal to or slightly larger than that of the bump 11. Through the design of the rectangular bump and the rectangular opening, the chance of the second optical film 30 being rotated relative to the substrate 10 may be reduced, while it is not limited thereto.

In addition, the bump 11 and the opening 31 may also have more different shapes, as long as the shapes and sizes of the two are corresponding so as to achieve the aforementioned effects of positioning and/or rotation reduction. In addition, similar to the second optical film 30, the first optical film 20 may also have an opening 31, so that the first optical film 20 may be positioned on the substrate 10 through the aforementioned mechanism and/or the chance of the first optical film 20 being rotated relative to the substrate 10 may be reduced, while it is not limited thereto.

In one embodiment, the present disclosure may at least compare the presence/absence or arrangement of an object through mechanism observation, so as to determine whether the operation of the object falls within the scope of the present disclosure by taking, for example, the presence/absence or arrangement of the object as evidence, but it is not limited thereto.

The details or features of the various embodiments of the present disclosure may be mixed and matched as long as they do not violate the spirit of the disclosure or conflict with each other.

Accordingly, the first optical film 20 and the second optical film 30 of the electronic device 1 of the present disclosure have specially designed structural features, which can solve the problems of the existing technology.

The aforementioned specific embodiments should be interpreted as merely illustrative, and not limiting the rest of the present disclosure in any way, and the features of different embodiments may be mixed and matched as long as they do not conflict with each other.

The invention claimed is:

1. An electronic device, comprising:
a first substrate;
a first optical film disposed on the first substrate, wherein the first optical film includes an engaging portion; and
a second optical film disposed on the first substrate and including an upper surface and a lower surface opposite to each other, wherein the second optical film is in mutual interference with the engaging portion of the first optical film,
wherein the engaging portion includes a first portion, a second portion and an engaging structure, the first portion and the second portion are disposed on opposite sides of the engaging structure and arranged along a first direction perpendicular to a normal direction of the first substrate, one of the first portion and the second portion is disposed above the upper surface of the second optical film, and the other one is disposed below the lower surface of the second optical film;
wherein the first portion includes a first side and a second side opposite to the first side, the second portion includes a third side and a fourth side opposite to the third side, the first side is connected to the third side and the second side is not connected to the fourth side.

2. The electronic device as claimed in claim 1, wherein the engaging structure is a groove.

3. The electronic device as claimed in claim 1, wherein the engaging structure is a slit.

4. The electronic device as claimed in claim 1, wherein the first portion has a maximum length in a second direction perpendicular to the first direction and the normal direction of the first substrate, the second portion has a second maximum length in the second direction, and the first maximum length is not equal to the second maximum length.

5. The electronic device as claimed in claim 4, wherein the first maximum length is smaller than the second maximum length.

6. The electronic device as claimed in claim 1, wherein the second portion is closer to an edge portion of the first substrate than the first portion.

7. The electronic device as claimed in claim 6, wherein an overlap length of the second portion and the second optical film along the first direction is between 5 millimeters and 15 millimeters.

8. The electronic device as claimed in claim 7, wherein the overlap length of the second portion and the second optical film along the first direction is between 7.5 millimeters and 12 millimeters.

9. The electronic device as claimed in claim 1, wherein the first substrate has a bump, the second optical film has an opening, and the bump penetrates the opening.

10. The electronic device as claimed in claim 9, wherein the bump is in a circular shape.

11. The electronic device as claimed in claim 9, wherein the bump is in an elliptical shape.

12. The electronic device as claimed in claim 9, wherein the bump is in a rectangular shape.

13. The electronic device as claimed in claim 1, further comprising a plurality of electronic units, wherein the first optical film and the second optical film are disposed between the first substrate and the plurality of electronic units.

14. The electronic device as claimed in claim 1, wherein the engaging portion is adjacent to a corner of the first substrate.

15. The electronic device as claimed in claim 1, further comprising a second substrate and a plurality of electronic units, wherein the second substrate is disposed between the plurality of electronic units and the first substrate.

16. The electronic device as claimed in claim 15, further comprising a third optical film disposed on the second substrate.

17. The electronic device as claimed in claim 16, wherein the third optical film has a plurality of openings, each corresponding to a position of the second substrate on which one electronic unit is disposed.

18. The electronic device as claimed in claim 1, wherein the electronic device is a backlight module, and the first substrate is a backplane of the backlight module.

19. The electronic device as claimed in claim 16, wherein the first optical film, the second optical film or the third optical film is an optical film selected from the group consisting of a reflective film, an optical filter, a light enhancing film, and a light guide film.

20. The electronic device as claimed in claim 15, wherein the electronic unit is a light emitting unit, and the second substrate is a backlight plate.

* * * * *